United States Patent
Suzui

(10) Patent No.: US 8,127,874 B2
(45) Date of Patent: Mar. 6, 2012

(54) POWER SUPPLY DEVICE, INPUT-OUTPUT LIMIT SETTING METHOD IN POWER SUPPLY DEVICE, VEHICLE, AND VEHICLE POWER CONTROL METHOD

(75) Inventor: Kosuke Suzui, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 556 days.

(21) Appl. No.: 12/226,062

(22) PCT Filed: Apr. 13, 2007

(86) PCT No.: PCT/JP2007/058166
§ 371 (c)(1),
(2), (4) Date: Oct. 7, 2008

(87) PCT Pub. No.: WO2007/119820
PCT Pub. Date: Oct. 25, 2007

(65) Prior Publication Data
US 2009/0321163 A1 Dec. 31, 2009

(30) Foreign Application Priority Data
Apr. 14, 2006 (JP) .................................. 2006-112634

(51) Int. Cl.
*H02J 7/00* (2006.01)
*B60K 6/20* (2007.10)
*B60W 10/00* (2006.01)
*B60L 9/00* (2006.01)
*G01R 31/36* (2006.01)

(52) U.S. Cl. .................. 180/65.265; 180/65.21; 701/22; 702/63; 320/132

(58) Field of Classification Search .................... 320/132
See application file for complete search history.

(56) References Cited

U.S. PATENT DOCUMENTS

| 6,545,449 | B2 * | 4/2003 | Ueda et al. | 320/132 |
| 7,514,903 | B2 * | 4/2009 | Lee | 320/150 |
| 2004/0231897 | A1 * | 11/2004 | Kimura et al. | 180/65.2 |
| 2005/0178594 | A1 * | 8/2005 | Yamauchi et al. | 180/65.2 |
| 2006/0076926 | A1 * | 4/2006 | Lee | 320/112 |

FOREIGN PATENT DOCUMENTS

| JP | A-10-136502 | 5/1998 |
| JP | A-10-257603 | 9/1998 |
| JP | A-2001-060465 | 3/2001 |

(Continued)

*Primary Examiner* — Patrick Assouad
*Assistant Examiner* — Steve T Chung
(74) *Attorney, Agent, or Firm* — Oliff & Berridge, PLC

(57) ABSTRACT

When a time average of square values of charge-discharge current exceeds a predetermined reference value and when a state of charge of a battery is higher than a preset reference level, the procedure corrects a basic input limit set according to a battery temperature and the state of charge and sets the corrected basic input limit to an effective input limit. When the state of charge is lower than a preset reference level, the procedure of the invention corrects a basic output limit set according to the battery temperature and the state of charge and sets the corrected basic output limit to an effective output limit. This arrangement more adequately sets the effective input limit and the effective output limit, compared with a technique of simultaneously correcting the effective input limit and the effective output limit based on the temperature of the battery.

13 Claims, 8 Drawing Sheets

FOREIGN PATENT DOCUMENTS

| | | |
|---|---|---|
| JP | A-2001-186669 | 7/2001 |
| JP | A-2002-233070 | 8/2002 |
| JP | A-2003-068342 | 3/2003 |
| JP | A-2004-023810 | 1/2004 |
| JP | A-2005-130559 | 5/2005 |
| JP | A-2005-218250 | 8/2005 |

* cited by examiner

POWER SUPPLY DEVICE, INPUT-OUTPUT LIMIT SETTING METHOD IN POWER SUPPLY DEVICE, VEHICLE, AND VEHICLE POWER CONTROL METHOD

TECHNICAL FIELD

The present invention relates to a power supply device, an input-output limit setting method in the power supply device, a vehicle, and a vehicle control method.

BACKGROUND ART

One proposed structure of a power supply device is equipped with a chargeable and dischargeable battery (see, for example, Patent Document 1). The power supply device of this proposed structure sets an output limit as an electric power dischargeable power from the battery, based on the state of charge and the temperature of the battery, in order to prevent deterioration of the battery due to a decrease in state of charge of the battery or a temperature increase of the battery.

Patent Document 1: Japanese Patent Laid-Open No. H10-136502

DISCLOSURE OF THE INVENTION

A conventional technique of preventing a significant temperature increase of the battery in the power supply device simultaneously decreases the output limit of the battery and an input limit as an electric power chargeable into the battery when the temperature of the battery exceeds a predetermined threshold value, so as to reduce both a charge current and a discharge current of the battery. The simultaneous decrease of the input limit and the output limit of the battery, however, abruptly decreases the electric power output from the battery, while preventing a significant temperature increase of the battery. In the power supply device of this structure mounted on a vehicle to be used as an electric power source of a motor for outputting a driving power to an axle, such an abrupt decrease of the output electric power from the battery leads to an abrupt decrease of the output power of the motor and undesirably makes the driver feel odd and uncomfortable. Optimum control of the electric power output from the battery is demanded by adequately setting the input limit and the output limit of the battery.

An object of the present invention is to provide the power supply device equipped with a chargeable and dischargeable battery, the input-output limit setting method in the power supply device, the vehicle, and the vehicle control method, that adequately set an input limit and an output limit of a battery The present invention accomplishes at least part of the demand mentioned above and the other relevant demands by the following configurations applied to the power supply device, the input-output limit setting method in the power supply device, the vehicle, and the vehicle control method.

According to one aspect, the invention is directed to a power supply device constructed to input and output electric power. The power supply device includes: a driving source configured to output power to a driveshaft linked with an axle of the vehicle; a motor configured to input and output power from and to the driveshaft; an accumulator designed to be chargeable and dischargeable and arranged to enable transmission of electric power from and to the motor; a temperature sensor constructed to measure temperature of the accumulator; a charge-discharge current meter constructed to measure a charge-discharge current to be charged into or discharged from the accumulator; a state-of-charge calculator configured to compute a state of charge as an indication of an amount of electric power dischargeable from the accumulator, based on the measured charge-discharge current; an input limit setter configured to set a basic input limit, as a maximum allowable electric power to be charged into the accumulator, according to the computed state of charge and the measured temperature, correct the set basic input limit based on the measured charge-discharge current, and set the corrected basic input limit to an effective input limit; an output limit setter configured to set an effective output limit, as a maximum allowable electric power to be discharged from the accumulator, according to the computed state of charge and the measured temperature; and a controller configured to control the driving source and the motor to charge and discharge the accumulator in a range defined by the set effective input limit and the set effective output limit.

The power supply device according to one aspect of the invention computes the state of charge as the indication of the amount of electric power dischargeable from the accumulator, based on the charge-discharge current to be charged into or discharged from the accumulator. The power supply device sets the basic input limit, as the maximum allowable electric power to be charged into the accumulator, according to the computed state of charge and the temperature of the accumulator, corrects the set basic input limit based on the charge-discharge current, and sets the corrected basic input limit to the effective input limit. Namely the basic input limit set according to the computed state of charge and the temperature of the accumulator is corrected with the charge-discharge current and is then set to the effective input limit. The power supply device also sets the effective output limit, as the maximum allowable electric power to be discharged from the accumulator, according to the computed state of charge and the temperature of the accumulator. The power supply device of this arrangement more adequately sets the effective input limit and the effective output limit, compared with the conventional technique of simultaneously correcting the effective input limit and the effective output limit of the accumulator based on the temperature of the accumulator.

In one preferable embodiment of the invention, the power supply device further has a square current calculator configured to compute a time average of square values of the measured charge-discharge current. When the computed time average exceeds a preset average value, the input limit setter makes a decreasing correction of the basic input limit and sets the corrected basic input limit to the effective input limit. When the time average of square values of the measured charge-discharge current exceeds the preset average value, the power supply device of this embodiment restricts charging of the accumulator and decreases the charge current of charging the accumulator, thus effectively preventing a significant temperature increase of the accumulator. In one preferable application of the power supply device of this embodiment, when the computed time average exceeds the preset average value, the input limit setter corrects the basic input limit to have a decreasing tendency with elapse of time and sets the corrected basic input limit to the effective input limit. The power supply device of this arrangement decreases the electric power chargeable into the accumulator with elapse of time, thus gradually lowering the state of charge of the accumulator with elapse of time.

In the power supply device according to the above aspect of the invention, it is preferable that the output limit setter sets a basic output limit as the maximum allowable electric power to be discharged from the accumulator according to the computed state of charge and the measured temperature, corrects the set basic output limit based on the computed state of charge, and sets the corrected basic output limit to the effective output limit. Namely the basic output limit set according to the computed state of charge and the temperature of the accumulator is corrected with the computed state of charge and is then set to the effective output limit.

In another preferable application of the power supply device of the above embodiment equipped with the square current calculator, the output limit setter sets a tentative basic output limit, as the maximum allowable electric power to be discharged from the accumulator, according to the measured temperature and, when the computed state of charge is lower than a preset first state-of-charge level, makes a decreasing correction of the tentative basic output limit and sets the decreasingly corrected tentative basic output limit to a basic output limit. When the computed state of charge becomes lower than a preset second state-of-charge level, which is higher than the first state-of-charge level, in the case of decreasingly correcting the basic input limit, the output limit setter makes a decreasing correction of the basic output limit and sets the decreasingly corrected basic output limit to the effective output limit. The power supply device of this arrangement makes the decreasing correction of the basic output limit and sets the decreasingly corrected basic output limit to the effective output limit, while making the decreasing correction of the basic input limit and setting the decreasingly corrected basic input limit to the effective input limit.

In another preferable embodiment of the invention, the power supply device further has: a voltage sensor configured to measure an inter-terminal voltage of an output terminal of the accumulator; and an internal pressure sensor configured to measure an internal pressure of the accumulator. The input limit setter sets the basic input limit as the allowable maximum electric power to be charged into the accumulator according to at least one of the measured inter-terminal voltage and the measured internal pressure, in addition to the computed state of charge and the measured temperature. The output limit setter sets a basic output limit as the maximum allowable electric power to be discharged from the accumulator according to at least one of the measured inter-terminal voltage and the measured internal pressure, in addition to the computed state of charge and the measured temperature. The power supply device of this arrangement sets the basic input limit and the basic output limit by taking into account at least one of the inter-terminal voltage of the output limit of the accumulator and the internal pressure of the accumulator.

According to another aspect, the invention is also directed to a vehicle including: a driving source configured to output power to a driveshaft linked with an axle of the vehicle; a motor configured to input and output power from and to the driveshaft; an accumulator designed to be chargeable and dischargeable and arranged to enable transmission of electric power from and to the motor; a temperature sensor constructed to measure temperature of the accumulator; a charge-discharge current meter constructed to measure a charge-discharge current to be charged into or discharged from the accumulator; a state-of-charge calculator configured to compute a state of charge as an indication of an amount of electric power dischargeable from the accumulator, based on the measured charge-discharge current; an input limit setter configured to set a basic input limit, as a maximum allowable electric power to be charged into the accumulator, according to the computed state of charge and the measured temperature, correct the set basic input limit based on the measured charge-discharge current, and set the corrected basic input limit to an effective input limit; an output limit setter configured to set an effective output limit, as a maximum allowable electric power to be discharged from the accumulator, according to the computed state of charge and the measured temperature; and a controller configured to control the driving source and the motor to charge and discharge the accumulator in a range defined by the set effective input limit and the set effective output limit.

The vehicle according to another aspect of the invention computes the state of charge as the indication of the amount of electric power dischargeable from the accumulator, based on the charge-discharge current to be charged into or discharged from the accumulator. The vehicle sets the basic input limit, as the maximum allowable electric power to be charged into the accumulator, according to the computed state of charge and the temperature of the accumulator, corrects the set basic input limit based on the charge-discharge current, and sets the corrected basic input limit to an effective input limit. Namely the basic input limit set according to the computed state of charge and the temperature of the accumulator is corrected with the charge-discharge current and is then set to the effective input limit. The vehicle also sets the effective output limit, as the maximum allowable electric power to be discharged from the accumulator, according to the computed state of charge and the temperature of the accumulator. The vehicle then controls the driving source and the motor to charge and discharge the accumulator in the range defined by the set effective input limit and the set effective output limit. The vehicle of this arrangement more adequately sets the effective input limit and the effective output limit and enables optimum control of the driving source and the motor to charge and discharge the accumulator in the desired range, compared with the conventional technique of simultaneously correcting the effective input limit and the effective output limit of the accumulator based on the temperature of the accumulator.

In one preferable embodiment of the invention, the vehicle further has a square current calculator configured to compute a time average of square values of the measured charge-discharge current. When the computed time average exceeds a preset average value, the input limit setter makes a decreasing correction of the basic input limit and sets the corrected basic input limit to the effective input limit. When the time average of square values of the measured charge-discharge current exceeds the preset average value, the vehicle of this embodiment restricts charging of the accumulator and decreases the charge current of charging the accumulator, thus effectively preventing a significant temperature increase of the accumulator.

In the vehicle according to the above aspect of the invention, it is preferable that the output limit setter sets a basic output limit as the maximum allowable electric power to be discharged from the accumulator according to the computed state of charge and the measured temperature, corrects the set basic output limit based on the computed state of charge, and sets the corrected basic output limit to the effective output limit. Namely the basic output limit set according to the computed state of charge and the temperature of the accumulator is corrected with the computed state of charge and is then set to the effective output limit.

In another preferable embodiment of the invention, the vehicle further has: a voltage sensor configured to measure an inter-terminal voltage of an output terminal of the accumulator; and an internal pressure sensor configured to measure an internal pressure of the accumulator. The input limit setter sets the basic input limit as the allowable maximum electric power to be charged into the accumulator according to at least one of the measured inter-terminal voltage and the measured internal pressure, in addition to the computed state of charge and the measured temperature. The output limit setter sets a basic output limit as the maximum allowable electric power to be discharged from the accumulator according to at least one of the measured inter-terminal voltage and the measured internal pressure, in addition to the computed state of charge and the measured temperature. The vehicle of this arrangement sets the basic input limit and the basic output limit by taking into account at least one of the inter-terminal voltage of the output limit of the accumulator and the internal pressure of the accumulator.

In another preferable embodiment of the invention, the vehicle further has a state-of-charge display unit configured to display the computed state of charge of the accumulator. The vehicle of this arrangement displays the state of charge of the accumulator charged or discharged in the range of the adequately set effective input limit and effective output limit.

According to still another aspect, the present invention is further directed to an input-output limit setting method in a power supply device equipped with a chargeable and dischargeable accumulator and constructed to input and output electric power. The input-output limit setting method sets an effective input limit as a maximum allowable electric power to be charged into the accumulator and setting an effective output limit as a maximum allowable electric power to be discharged from the accumulator. The input-output limit setting method computes a state of charge as an indication of an amount of electric power dischargeable from the accumulator, based on a charge-discharge current to be charged into or discharged from the accumulator. The input-output limit setting method sets a basic input limit, as the maximum allowable electric power to be charged into the accumulator, according to the computed state of charge and a temperature of the accumulator, corrects the set basic input limit based on the charge-discharge current, and sets the corrected basic input limit to the effective input limit. The input-output limit setting method also sets the effective output limit, as the maximum allowable electric power to be discharged from the accumulator, according to the computed state of charge and the temperature of the accumulator.

The input-output limit setting method according to one aspect of the invention computes the state of charge as the indication of the amount of electric power dischargeable from the accumulator, based on the charge-discharge current to be charged into or discharged from the accumulator. The input-output limit setting method sets the basic input limit, as the maximum allowable electric power to be charged into the accumulator, according to the computed state of charge and the temperature of the accumulator, corrects the set basic input limit based on the charge-discharge current, and sets the corrected basic input limit to the effective input limit. Namely the basic input limit set according to the computed state of charge and the temperature of the accumulator is corrected with the charge-discharge current and is then set to the effective input limit. The input-output limit setting method also sets the effective output limit, as the maximum allowable electric power to be discharged from the accumulator, according to the computed state of charge and the temperature of the accumulator. In this manner, the input-output limit setting method sets the effective input limit by taking into account the state of charge of the accumulator, the temperature of the accumulator, and the charge-discharge current, while setting the effective output limit based on the state of charge of the accumulator and the temperature of the accumulator. The input-output limit setting method of this arrangement more adequately sets the effective input limit and the effective output limit, compared with the conventional technique of simultaneously correcting the effective input limit and the effective output limit of the accumulator based on the temperature of the accumulator.

According to another aspect, the invention is also directed to a vehicle control method for controlling a vehicle. The vehicle has: a power supply device equipped with a chargeable and dischargeable accumulator and constructed to input and output electric power; a driving source configured to output power to a driveshaft linked with an axle of the vehicle; and a motor configured to enable transmission of electric power to and from the power supply device and to input and output power from and to the driveshaft. The vehicle control method computes a state of charge as an indication of an amount of electric power dischargeable from the accumulator, based on a charge-discharge current to be charged into or discharged from the accumulator; sets a basic input limit, as a maximum allowable electric power to be charged into the accumulator, according to the computed state of charge and a temperature of the accumulator, corrects the set basic input limit based on the charge-discharge current, and sets the corrected basic input limit to an effective input limit; and sets an effective output limit, as a maximum allowable electric power to be discharged from the accumulator, according to the computed state of charge and the temperature of the accumulator. The vehicle control method controls the driving source and the motor to charge and discharge the accumulator in a range defined by the set effective input limit and the set effective output limit.

The vehicle control method according to another aspect of the invention computes the state of charge as the indication of the amount of electric power dischargeable from the accumulator, based on the charge-discharge current to be charged into or discharged from the accumulator. The vehicle control method sets the basic input limit, as the maximum allowable electric power to be charged into the accumulator, according to the computed state of charge and the temperature of the accumulator, corrects the set basic input limit based on the charge-discharge current, and sets the corrected basic input limit to an effective input limit. Namely the basic input limit set according to the computed state of charge and the temperature of the accumulator is corrected with the charge-discharge current and is then set to the effective input limit. The vehicle control method also sets the effective output limit, as the maximum allowable electric power to be discharged from the accumulator, according to the computed state of charge and the temperature of the accumulator. The vehicle control method then controls the driving source and the motor to charge and discharge the accumulator in the range defined by the set effective input limit and the set effective output limit. The vehicle control method of this arrangement enables optimum control of the driving source and the motor to charge and discharge the accumulator in the range of the effective input limit set by taking into account the state of charge of the accumulator, the temperature of the accumulator, and the charge-discharge current and the effective output limit set based on the state of charge of the accumulator and the temperature of the accumulator.

BEST MODES OF CARRYING OUT THE INVENTION

One mode of carrying out the invention is described below as a preferred embodiment with reference to the accompanied drawings.

Figure 1:
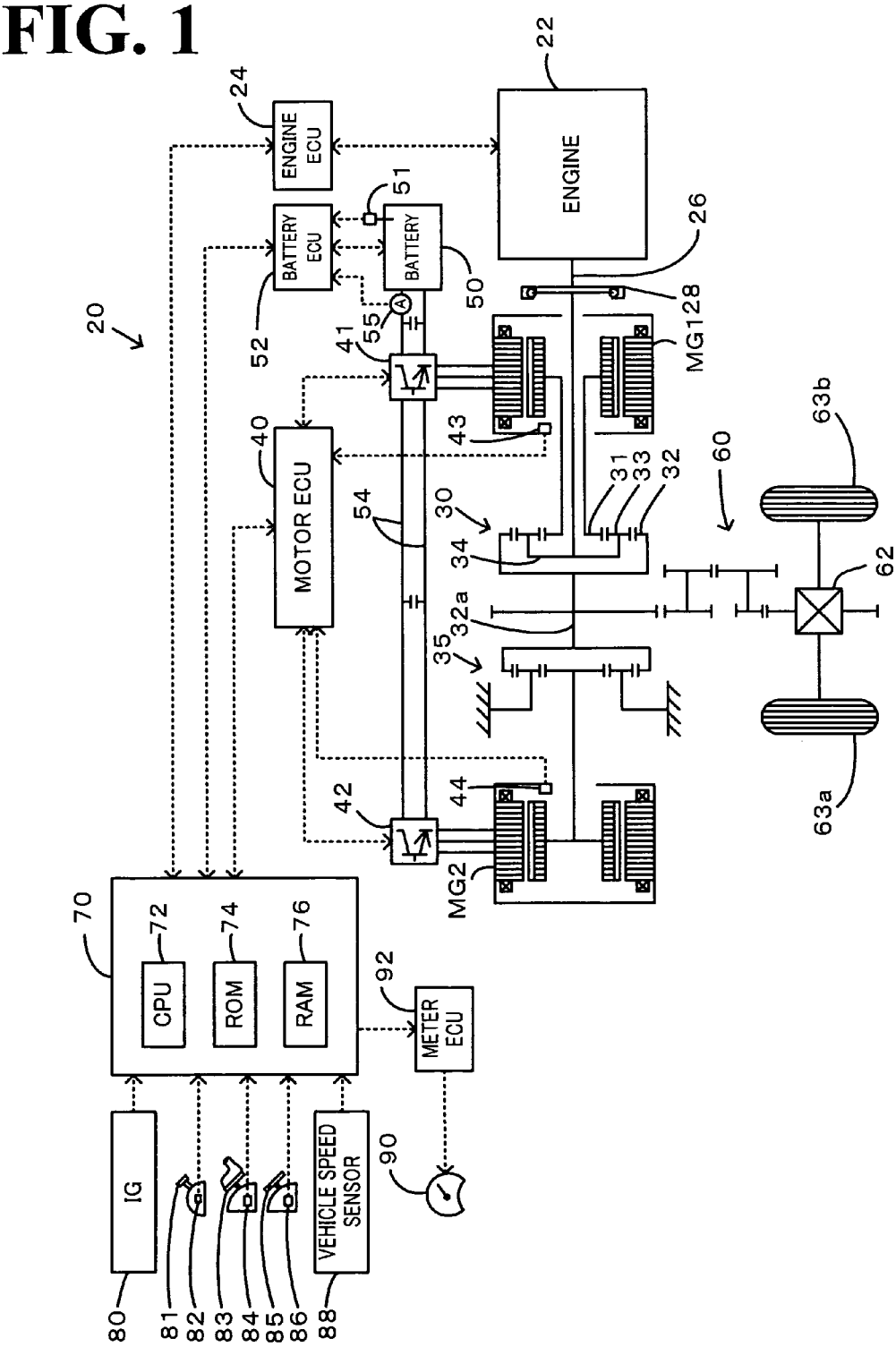
FIG. 1 schematically illustrates the configuration of a hybrid vehicle in one embodiment of the invention.

FIG. 1 schematically illustrates the construction of a hybrid vehicle 20 with a power output apparatus mounted thereon in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control and management of a battery electronic control unit (hereafter referred to as battery ECU) 52. The battery ECU 52 is constructed as a microprocessor including a CPU, a ROM configured to store processing programs, a RAM configured to temporarily store data, input and output ports, and a communication port, although not specifically illustrated. The battery ECU 52 inputs various signals required for management and control of the battery 50, for example, an inter-terminal voltage from a voltage sensor (not shown) located between terminals of the battery 50, a charge-discharge current Ib from a current sensor 55 located on the power line 54 connecting with an output terminal of the battery 50, and a battery temperature Tb from a temperature sensor 51 attached to the battery 50. The battery ECU 52 outputs data regarding the operating conditions of the battery 50 to the hybrid electronic control unit 70 by communication according to the requirements. For the purpose of management and control of the battery 50, the battery ECU 52 computes a remaining charge level or state of charge SOC of the battery 50 from integration of the charge-discharge current Ib measured by the current sensor 55. The battery ECU 52 stores data of the measured charge-discharge current Ib as an electricity record.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 is also equipped with a battery meter 90 provided in front of the driver's seat to display the state of charge SOC of the battery 50 in a visually recognizable manner. The display of the battery meter 90 is controlled by a meter electronic control unit (hereafter referred to as meter ECU) 92. The meter ECU 92 inputs the state of charge SOC of the battery 50, which is computed by the battery ECU 52, via the hybrid electronic control unit 70 by communication.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 2:
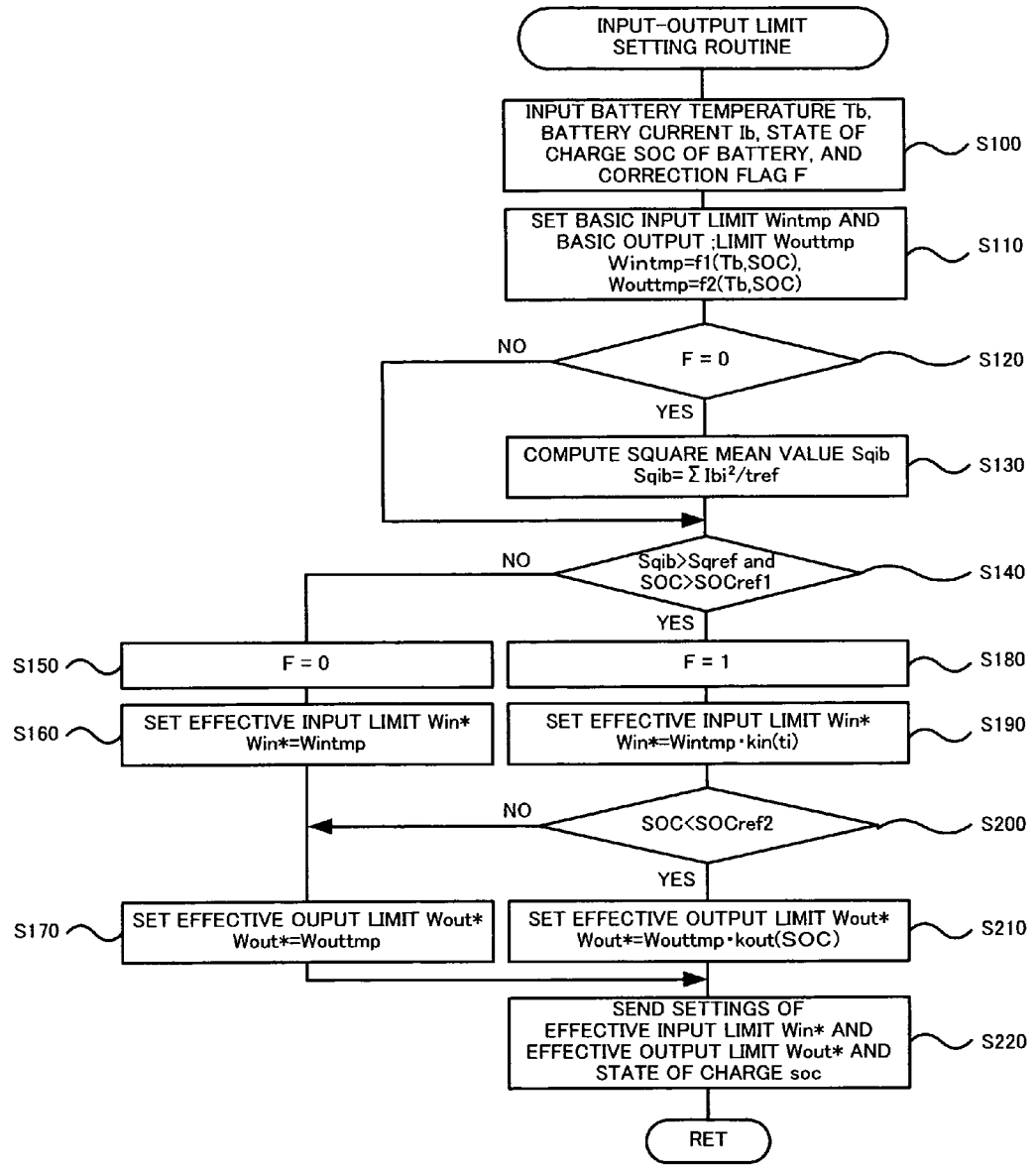
FIG. 2 is a flowchart showing an input-output limit setting routine executed by a battery ECU mounted on the hybrid vehicle of the embodiment.
Figure 8:
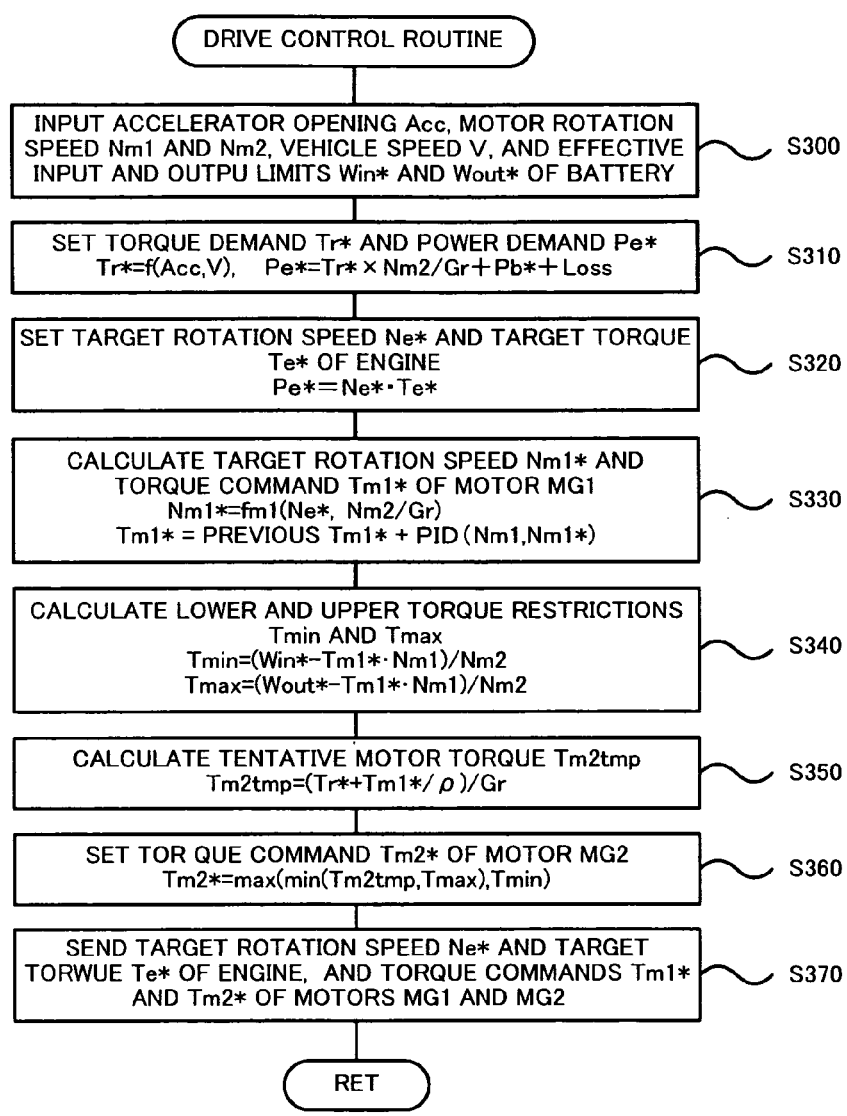
FIG. 8 is a flowchart showing a drive control routine executed by a hybrid electronic control unit mounted on the hybrid vehicle of the embodiment.

The following describes the operations of the hybrid vehicle 20 of the embodiment having the configuration discussed above, especially a series of operations in response to the driver's frequent depression and release of the accelerator pedal 83. FIG. 2 is a flowchart showing an input-output limit setting routine executed by the battery ECU 52 to set an effective input limit Win* and an effective output limit Wout* as allowable levels of electric power to be charged into and discharged from the battery 50. FIG. 8 is a flowchart showing a drive control routine executed by the hybrid electronic control unit 70 by utilizing the effective input limit Win* and the effective output limit Wout*. These routines are performed repeatedly at preset time intervals (for example, at every several msec). The explanation sequentially regards the process of setting the effective input limit Win* and the effective output limit Wout* and the drive control of the hybrid vehicle 20.

In the input-output limit setting routine, the CPU (not shown) of the battery ECU 52 first inputs various data required for setting, that is, the charge-discharge current Ib from the current sensor 55, the battery temperature Tb from the temperature sensor 51, a correction flag F, and the computed state of charge SOC of the battery 50 (step S100). The correction flag F is set to 1 upon requirement for correcting a basic input limit Wintmp and a basic output limit Wouttmp (described below) and is initialized to 0.

Figure 3:
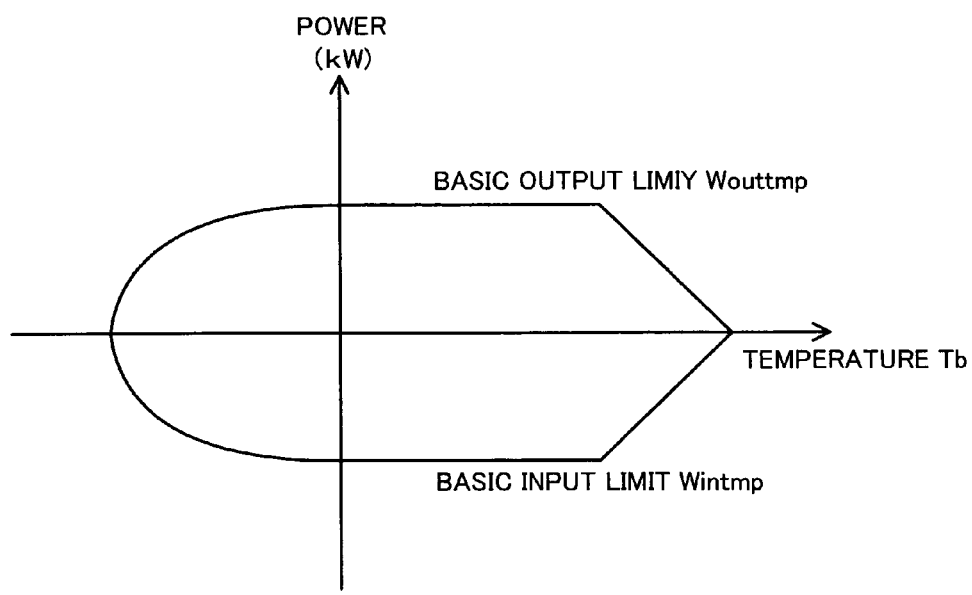
FIG. 3 shows variations of a basic input limit Wintmp and a basic output limit Wouttmp against battery temperature Tb of a battery.
Figure 4:
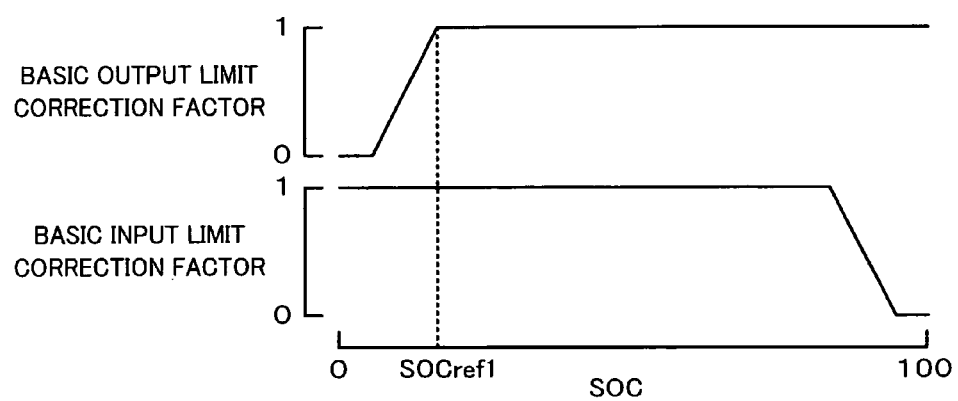
FIG. 4 shows variations of a basic input limit correction factor and a basic output limit correction factor against state of charge SOC of the battery.

After the data input, the CPU sets the basic input limit Wintmp and the basic output limit Wouttmp of the battery 50, based on the input battery temperature Tb and the input state of charge SOC (step S110). A concrete procedure of setting the basic input limit Wintmp and the basic output limit Wouttmp of the battery 50 sets base values of the basic input limit Win and the basic output limit Wout corresponding to the battery temperature Tb, specifies a basic input limit correction factor and a basic output limit correction factor corresponding to the state of charge SOC of the battery 50, and multiplies the base values of the basic input limit Wintmp and the basic output limit Wouttmp by the specified basic input limit correction factor and basic output limit correction factor to determine the basic input limit Wintmp and the basic output limit Wouttmp of the battery 50. FIG. 3 shows variations of the basic input limit Wintmp and the basic output limit Wouttmp against the battery temperature Tb of the battery 50. FIG. 4 shows variations of the basic input limit correction factor and the basic output limit correction factor against the state of charge SOC of the battery 50. The map of FIG. 4 is designed to decrease the basic output limit correction factor at a preset rate when the state of charge SOC is less than a preset reference level SOCref1.

The CPU subsequently identifies whether the correction flag F is equal to 0 (step S120). Upon identification of the correction flag F equal to 0, the CPU refers to the electricity record of the charge-discharge current Ib and divides an integration of square values of the charge-discharge current Ib measured in a time period of a time 'tref' before execution of a current cycle of this routine by the time 'tref' to compute a square mean value Sqib (step S130). The CPU then determines whether the computed square mean value Sqib exceeds a predetermined reference value Sqref, which expects the terminal of the battery 50 to reach the high temperature, and whether the state of charge SOC is higher than a preset reference level SOCref of the state of charge SOC, which restricts the output of the battery 50 (step S140). The comparison of the square mean value Sqib is based on the following reason. The terminal of the battery 59 is a resistor body and consumes electric power in the course of both charging and discharging. This consumed electric power contributes to increase the temperature of the terminal. The square value of the measured charge-discharge current Ib is accordingly used for consideration of both the charge current and the discharge current. The terminal of the battery 50 has a certain heat capacity and accordingly has only a small temperature increase in one charging cycle or in one discharging cycle. The temperature of the terminal of the battery 50 thus gradually increases through repetition of charging and discharging cycles. The use of the square of a momentary value of the measured charge-discharge current Ib does not take into account the heat capacity of the terminal of the battery 50. The use of the square mean value Sqib as a time-averaged square value of the charge-discharge current Ib measured in the time tref, on the other hand, takes into account the heat capacity of the terminal of the battery 50. The time tref is set according to the heat capacity of the terminal of the battery 50 to be lengthened with an increase in heat capacity of the terminal of the battery 50. This is because the large heat capacity of the terminal of the battery 50 restricts a temperature increase. The integration of the charge-discharge current in a longer time enables more accurate estimation of a temperature increase of the terminal of the battery 50.

When the square mean value Sqib is not greater than the predetermined reference value Sqref, it is determined that the charge-discharge current is relatively small on average in the time tref and that there is little potential for the terminal of the battery 50 to reach a high temperature level. The correction flag F is accordingly reset from 1 to 0 (step S150). When the state of charge SOC is not higher than the preset reference level SOCref1, it is determined that the relatively low state of charge of the battery 50 suggests inadequate restriction for charging the battery 50. The correction flag F is accordingly reset to 0 (step S150). The CPU subsequently sets the basic input limit Wintmp to an effective input limit Win* (step S160) and sets the basic output limit Wouttmp to an effective output limit Wout* (step S170). The CPU sends the settings of the effective input limit Win* and the effective output limit Wout* and the state of charge SOC to the hybrid electronic control unit 70 (step S220) and terminates the input-output limit setting routine. The hybrid electronic control unit 70 receives the settings of the effective input limit Win* and the effective output limit Wout* and the state of charge SOC and executes a drive control routine as explained later. The state of charge SOC is further sent from the hybrid electronic control unit 70 to the meter ECU 92. The meter ECU 92 receives the state of charge SOC and performs a series of processing to display the state of charge SOC on the battery meter 90. When the square mean value Sqib is not greater than the predetermined reference value Sqref or when the state of charge SOC is not higher than the preset reference level SOCref1, the basic input limit Wintmp and the basic output limit Wouttmp set according to the battery temperature Tb and the state of charge SOC at step S110 are respectively set to the effective input limit Win* and the effective output limit Wout*.

When the square mean value Sqib exceeds the predetermined reference value Sqref and when the state of charge SOC is higher than the preset reference level SOCref1, on the other hand, it is determined that there is a potential for the terminal of the battery 50 to reach the high temperature level and that the sufficiently high state of charge SOC suggests adequate restriction for charging the battery 50. The correction flag F is accordingly set to 1 (step S180). The CPU then sets an input limit correction factor kin(ti) based on a time 'ti' elapsed since the increase in square mean value Sqib to the predetermined reference value Sqref, and sets the product of the basic input limit Wintmp and the input limit correction factor kin (ti) to the effective input limit Win* (step S190).

Figure 5:
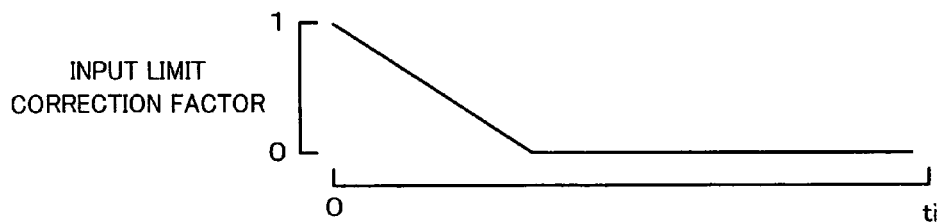
FIG. 5 shows a variation in input limit correction factor kin (ti) against time 'ti'.

Here the time 'ti' represents a time counted by a timer (not shown), which starts counting the time upon determination that the square mean value Sqib exceeds the predetermined reference value Sqref at step S130 and resets the time count upon determination that the square mean value Sqib is not greater than the predetermined reference value Sqref. FIG. 5 shows a variation in input limit correction factor kin (ti) against the time 'ti'. As shown in FIG. 5, the input limit correction factor kin (ti) is set to decrease at a preset rate α with an increase in time 'ti'. Namely the effective input limit Win* is set to decrease with an increase in time 'ti'. The lower input limit of the battery 50 enhances the restriction of charging the battery 50 and lowers the state of charge SOC of the battery 50 to decrease the output power from the motor MG2. In this circumstance, in order to ensure the required driving power, the power to be output from the engine 22 is increased. This may lead to an abrupt increase of noise generation. The rate α is set to prevent the driver from feeling odd or uncomfortable with such an abrupt increase of noise generation. In this manner, when the square mean value Sqib exceeds the predetermined reference value Sqref and when the state of charge SOC is higher than the preset reference level SOCref1, the effective input limit Win* is set to decrease with an increase in time 'ti'.

In response to setting the correction flag F to 1, the next cycle of this routine skips the computation of the square mean value Sqib at step S130 but direct goes from step S120 to step S140. In this state, the square mean value Sqib is not updated but is kept greater than the predetermined reference value Sqref. The decision step S140 substantially determines only whether the state of charge SOC is higher than the preset reference level SOCref1. The CPU repeatedly executes the processing flow of and after step S180 until the state of charge SOC decreases to or below the preset reference level SOCref1.

Charging the battery 50 is restricted by setting the decreasingly corrected basic input limit Wintmp to the effective input limit Win*. It is accordingly determined whether the state of charge SOC of the battery 50 is lower than a preset reference level SOCref2 for output restriction due to the restricted charging (step S200). The reference level SOCref2 is set to be greater than the reference level SOCref1. When the state of charge SOC is not lower than the preset reference level SOCref2, there is no need of further restricting the power discharge from the battery 50. The basic output limit Wouttmp set at step S110 is accordingly set to the effective output limit Wout* (step S170). The CPU sends the settings of the effective input limit Win* and the effective output limit Wout* and the state of charge SOC to the hybrid electronic control unit 70 (step S220) and terminates the input-output limit setting routine. In this manner, when the state of charge SOC of the battery 50 is not lower than the preset reference level SOCref2, the basic output limit Wouttmp set at step S110 is set to the effective output limit Wout*.

Figure 6:
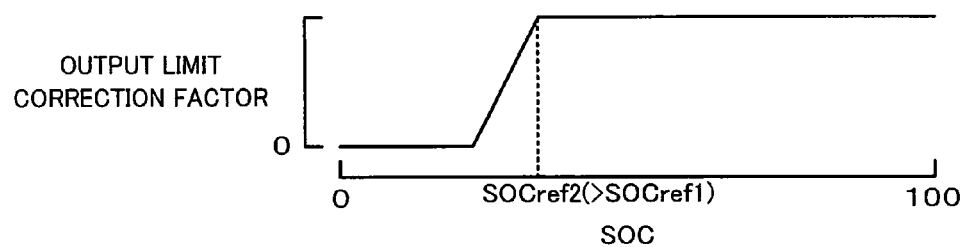
FIG. 6 shows a variation in output limit correction factor kout (SOC) against the state of charge SOC of the battery.

When the state of charge SOC is lower than the preset reference level SOCref2, on the other hand, the CPU sets an output limit correction factor kout (SOC) based on the state of charge SOC and sets the product of the basic output limit Wouttmp and the output limit correction factor kout (SOC) to the effective output limit Wout* (step S210). The CPU sends the settings of the effective input limit Win* and the effective output limit Wout* and the state of charge SOC to the hybrid electronic control unit 70 (step S220) and terminates the input-output limit setting routine. FIG. 6 shows a variation in output limit correction factor kout (SOC) against the state of charge SOC of the battery 50. As shown in FIG. 6, the output limit correction factor kout (SOC) is set to decrease at a preset rate β under the condition that the state of charge SOC of the battery 50 is lower than the preset reference level SOCref2. As mentioned above, the reference level SOCref2 is greater than the reference level SOCref1. The rate β is set to promptly decrease the output from the battery 50. The processing flow sets the decreasingly corrected basic input limit Wintmp to the effective input limit Win* and subsequently sets the decreasingly corrected basic output limit Wouttmp to the effective output limit Wout*. The decreasing correction of the basic input limit Wintmp decreases the electric power to charge the battery 50 and lowers the state of charge SOC. This leads to the smaller indicated value of the battery meter 90. Restriction of discharging the battery 50 accompanied with the smaller indicated value of the battery meter 90 restricts the power output from the motor MG2. In this manner, when the state of charge SOC of the battery 50 is lower than the preset reference level SOCref2, the decreasingly corrected basic output limit Wouttmp is set to the effective output limit Wout*.

Figure 7:
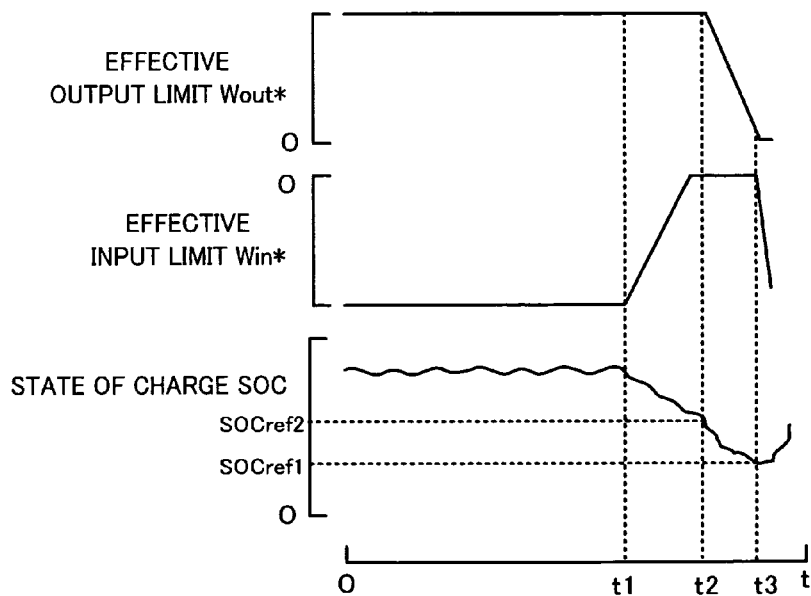
FIG. 7 shows time changes of the settings of an effective input limit Win* and an effective output limit Wout* and the state of charge SOC.

The battery 50 may be repeatedly charged and discharged within a relatively short time period under the conditions that the state of charge SOC has margins to both charging and discharging and that the battery temperature Tb is not in such a high range that requires restriction of charging or discharging the battery 50. For example, the driver's frequent depression and release of the accelerator pedal 83 causes the repeated charge and discharge of the battery 50. FIG. 7 shows time changes of the settings of the effective input limit Win* and the effective output limit Wout* and the state of charge SOC. When the square mean value Sqib of charge-discharge current of the battery 50 is not greater than the predetermined reference value Sqref, the basic input limit Wintmp and the basic output limit Wouttmp set at step S110 are directly set to the effective input limit Win* and to the effective output limit Wout* without correction (steps S140, S150 to S170, and S220). Under the conditions that the state of charge SOC has margins to both charging and discharging and that the battery temperature Tb is not in such a high range that requires restriction of charging or discharging the battery 50, the effective input limit Win* and the effective output limit Wout* are set to relatively large values as shown in FIG. 7.

When the repeated charge and discharge of the battery 50 causes the square mean value Sqib to exceed the predetermined reference value Sqref (step S140, timing t1 in FIG. 7), the decreasingly corrected basic input limit Wintmp is set to the effective input limit Win*. The basic output limit Wouttmp set at step S110 is, on the other hand, directly set to the effective output limit Wout* without correction until the state of charge SOC decreases below the preset reference level SOCref2 (steps S180, S190, S200, S170, and S220). This series of processing decreases the effective input limit Win* with elapse of time, while setting the effective output limit Wout* based on the battery temperature Tb and the state of charge SOC of the battery 50. Under the conditions that the state of charge SOC has margins to both charging and discharging and that the battery temperature Tb is not in such a high range that requires restriction of charging or discharging the battery 50, charging the battery 50 is restricted with elapse of time, while discharging the battery 50 is not restricted immediately to gradually lower the state of charge SOC. Restriction of charging the battery 50 decreases the charge current of the battery 50 and thereby prevents a significant temperature increase of the terminal of the battery 50. Non-restriction of discharging the battery 50 ensures the required output power from the motor MG2.

When the state of charge SOC of the battery 50 decreases below the preset reference level SOCref2 (timing t2 in FIG. 7), the decreasingly corrected basic output limit Wouttmp is set to the effective output limit Wout* (steps S200, S210, and S220). The effective output limit Wout* decreases with a decrease in state of charge SOC. The lower effective output limit Wout* causes restriction of discharging the battery 50 with elapse of time to further lower the state of charge SOC. Restriction of charging and discharging the battery 50 decreases both the charge current and the discharge current of the battery 50 and thereby further prevents the temperature increase of the terminal of the battery 50. Restriction of charging the battery 50 lowers the state of charge SOC and decreases the indicated value of the battery meter 90. When the state of charge SOC of the battery 50 decreases below the preset reference level SOCref2, discharging the battery 50 is limited to restrict the power output from the motor MG2. The restricted power output from the motor MG2 in correlation with the decrease of the indicated value on the battery meter 90 effectively prevents the driver from feeling odd and uncomfortable. In order to prevent the driver from feeling odd and uncomfortable by restriction of the power output from the motor MG2 to the driveshaft with the indicated value of the battery meter 90 showing a sufficient state of charge SOC of the battery 50, one possible measure corrects the indicated value of the battery meter 90. In this embodiment, however, the indicated value of the battery meter 90 continuously represents the actual state of charge SOC of the battery 50. This arrangement of the embodiment thus well informs the driver of the accurate state of charge SOC of the battery 50.

When restriction of discharging the battery 50 with elapse of time decreases the state of charge SOC to or below the preset reference level SOCref1 (step S140, timing t3 in FIG. 7), the correction flag F is reset to 0 (step S150). The basic input limit Wintmp and the basic output limit Wouttmp are then directly set to the effective input limit Win* and to the effective output limit Wout* without correction (steps S160 and S170). This recovers the SOC (state of charge) level of the battery 50.

The following description regards the drive control routine executed with the settings of the effective input limit Win* and the effective output limit Wout*. In the drive control routine of FIG. 8, the CPU 72 of the hybrid electronic control unit 70 first inputs various data required for control, the accelerator opening Acc from the accelerator pedal position sensor 84, the vehicle speed V from the vehicle speed sensor 88, rotation speeds Nm1 and Nm2 of the motors MG1 and MG2, a rotation speed Ne of the engine 22, and the effective input limit Win* and the effective output limit Wout* of the battery 50 (step S300). The rotation speed Ne of the engine 22 is computed from a signal of a crank position sensor (not shown) attached to the crankshaft 26 and is input from the engine ECU 24 by communication. The rotation speeds Nm1 and Nm2 of the motors MG1 and MG2 are computed from the rotational positions of the rotors in the motors MG1 and MG2 detected by the rotational position detection sensors 43 and 44 and are input from the motor ECU 40 by communication. The effective input limit Win* and the effective output limit Wout* of the battery 50 are set according to the input-output limit setting routine of FIG. 2 and are input from the battery ECU 52 by communication.

Figure 9:
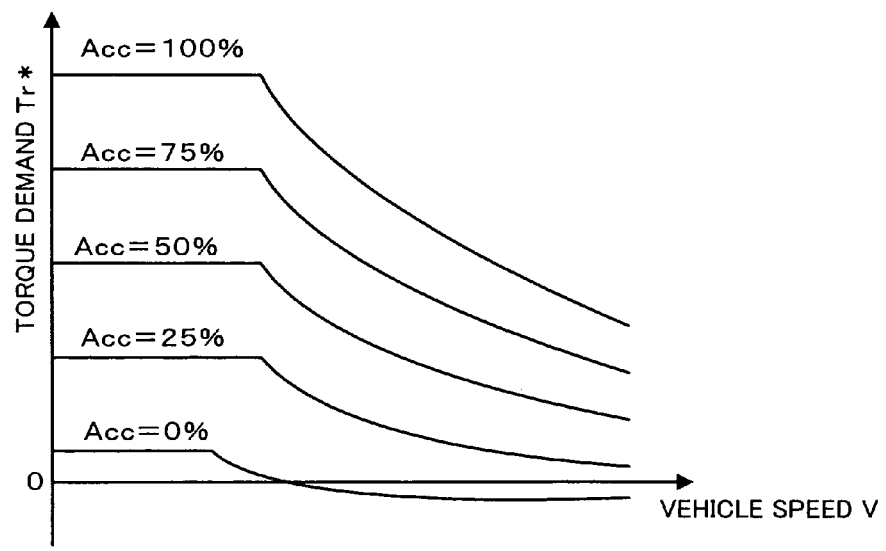
FIG. 9 shows one example of a torque demand setting map.

After the data input, the CPU 72 sets a torque demand Tr* to be output to the ring gear shaft 32a or the driveshaft linked with the drive wheels 63a and 63b as a torque required for the vehicle and a power demand Pe* required for the engine 22, based on the input accelerator opening Acc and the input vehicle speed V (step S310). A concrete procedure of setting the torque demand Tr* in this embodiment provides and stores in advance variations in torque demand Tr* against the vehicle speed V with regard to various settings of the accelerator opening Acc as a torque demand setting map in the ROM 74 and reads the torque demand Tr* corresponding to the given accelerator opening Acc and the given vehicle speed V from this torque demand setting map. One example of the torque demand setting map is shown in FIG. 9. The power demand Pe* is obtained as the sum of the product of the set torque demand Tr* and a rotation speed Nr of the ring gear shaft 32a, a charge-discharge power demand Pb* to be charged into or discharged from the battery 50, and a potential loss. The rotation speed Nr of the ring gear shaft 32a may be given by multiplying the vehicle speed V by a conversion factor k or by dividing the rotation speed Nm2 of the motor MG2 by a gear ratio Gr of the reduction gear 35.

Figure 10:
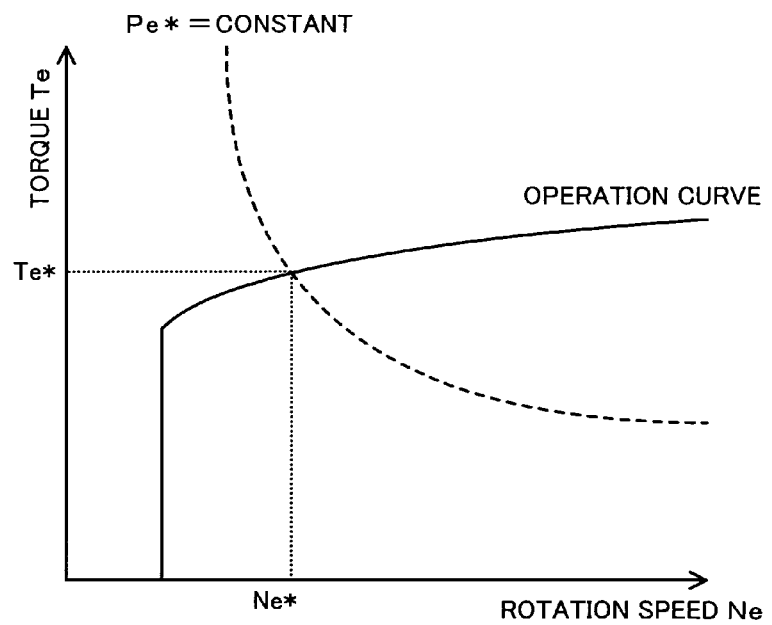
FIG. 10 shows a process of setting a target rotation speed Ne* and a target torque Te* with referring to an operation curve of the engine.

The CPU 72 subsequently sets a target rotation speed Ne* and a target torque Te* of the engine 22 according to the set power demand Pe* (step S320). The target rotation speed Ne* and the target torque Te* of the engine 22 are set according to an efficient operation curve of ensuring efficient operation of the engine 22 and a constant power demand Pe* curve. FIG. 10 shows a process of setting the target rotation speed Ne* and the target torque Te* with referring to an operation curve of the engine 22. As illustrated, the target rotation speed Ne* and the target torque Te* are specified as an intersection of this operation curve and a constant power demand Pe* curve (=Ne*×Te*).

Figure 11:
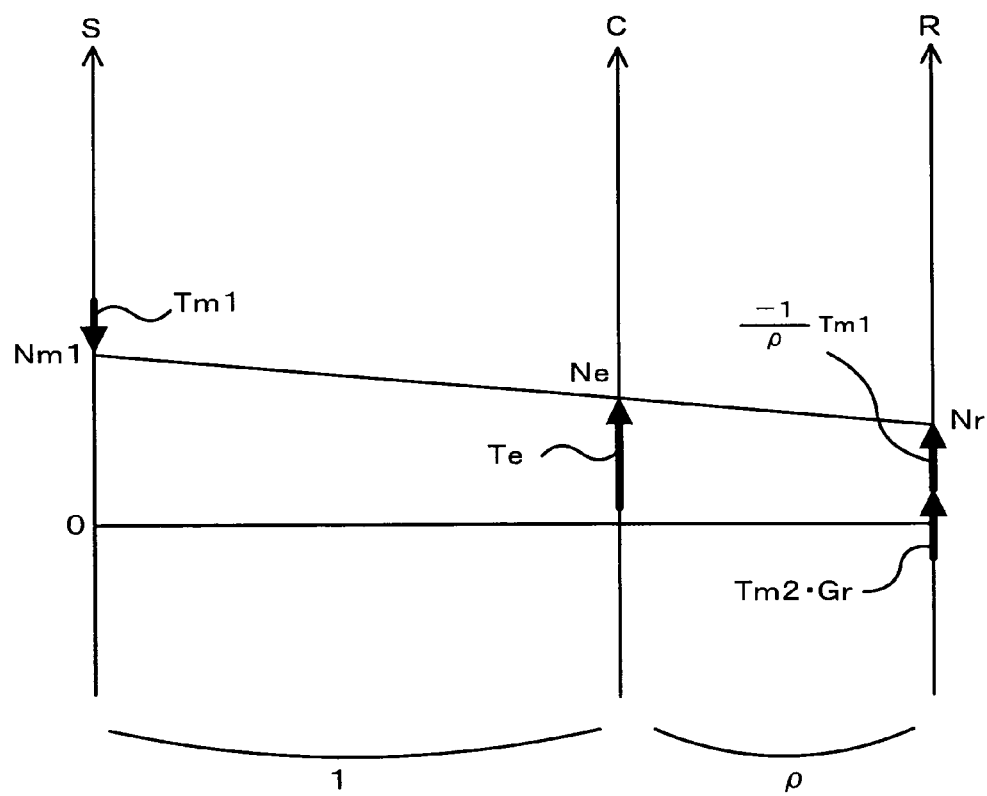
FIG. 11 is an alignment chart showing torque-rotation speed dynamics of respective rotational elements included in a power distribution integration mechanism.

The CPU 72 calculates a target rotation speed Nm1* of the motor MG1 from the set target rotation speed Ne* of the engine 22, the rotation speed Nr (=Nm2/Gr) of the ring gear shaft 32a, and a gear ratio ρ of the power distribution integration mechanism 30 according to Equation (1) given below, while calculating a torque command Tm1* of the motor MG1 from the calculated target rotation speed Nm1* and the current rotation speed Nm1 of the motor MG1 according to Equation (2) given below (step S330). Equation (1) is a dynamic relational expression of the rotational elements included in the power distribution integration mechanism 30. FIG. 11 is an alignment chart showing torque-rotation speed dynamics of the respective rotational elements included in the power distribution integration mechanism 30. A left S-axis represents a rotation speed of the sun gear 31 that is equivalent to the rotation speed Nm1 of the motor MG1. A middle C-axis represents a rotation speed of the carrier 34 that is equivalent to the rotation speed Ne of the engine 22. A right R-axis represents the rotation speed Nr of the ring gear 32 obtained by dividing the rotation speed Nm2 of the motor MG2 by the gear ratio Gr of the reduction gear 35. Equation (1) is readily introducible from this alignment chart. Two thick arrows on the R-axis respectively show a torque applied to the ring gear shaft 32a by output of the torque Tm1 from the motor MG1, and a torque applied to the ring gear shaft 32a via the reduction gear 35 by output of the torque Tm2 from the motor MG2. Equation (2) is a relational expression of feedback control to drive and rotate the motor MG1 at the target rotation speed Nm1*. In Equation (2), a coefficient 'k1' in a second term and a coefficient 'k2' in a third term on the right side respectively denote a gain of a proportional and a gain of an integral term.

$$Nm1^* = Ne^* \cdot (1+\rho)/\rho - Nm2/(Gr \cdot \rho) \quad (1)$$

$$Tm1^* = PreviousTm1^* + k1(Nm1^* - Nm1) + k2\int(Nm1^* - Nm1)dt \quad (2)$$

After calculation of the target rotation speed Nm1* and the torque command Tm1* of the motor MG1, the CPU 72 calculates a lower torque restriction Tmin and an upper torque restriction Tmax as allowable minimum and maximum torques output from the motor MG2 according to Equations (3) and (4) given below (step S340). The lower torque restriction Tmin and the upper torque restriction Tmax are obtained by dividing respective differences between the effective input limit Win* or the effective output limit Wout* of the battery 50 and power consumption (power generation) of the motor MG1, which is the product of the calculated torque command Tm1* and the current rotation speed Nm1 of the motor MG1, by the current rotation speed Nm2 of the motor MG2. The CPU 72 then calculates a tentative motor torque Tm2tmp to be output from the motor MG2 from the torque demand Tr*, the torque command Tm1* of the motor MG1, the gear ratio ρ of the power distribution integration mechanism 30, and the gear ratio Gr of the reduction gear 35 according to Equation (5) given below (step S350). The CPU 72 then limits the calculated tentative motor torque Tm2tmp by the lower and the upper torque restrictions Tmin and Tmax to set a torque command Tm2* of the motor MG2 (step S360). Setting the torque command Tm2* of the motor MG2 in this manner restricts the torque demand Tr* to be output to the ring gear shaft 32a or the driveshaft in the range of the effective input limit Win* and the effective output limit Wout* of the battery 50. Equation (5) is readily introduced from the alignment chart of FIG. 11.

$$Tmin = (Win^* - Tm1^* \cdot Nm1)/Nm2 \quad (3)$$

$$Tmax = (Wout^* - Tm1^* \cdot Nm1)/Nm2 \quad (4)$$

$$Tm2tmp = (Tr^* + Tm1^*/\rho)/Gr \quad (5)$$

After setting the target rotation speed Ne* and the target torque Te* of the engine 22 and the torque commands Tm1* and Tm2* of the motors MG1 and MG2, the CPU 72 sends the settings of the target rotation speed Ne* and the target torque Te* of the engine 22 to the engine ECU 24 and the settings of the torque commands Tm1* and Tm2* of the motors MG1 and MG2 to the motor ECU 40 (step S370) and terminates the drive control routine. In response to reception of the settings of the target rotation speed Ne* and the target torque Te*, the engine ECU 24 performs required controls including fuel injection control and ignition control of the engine 22 to drive the engine 22 at a drive point defined by the combination of the target rotation speed Ne* and the target torque Te*. In response to reception of the settings of the torque commands Tm1* and Tm2*, the motor ECU 40 performs switching control of switching elements included in the respective inverters 41 and 42 to drive the motor MG1 with the torque command Tm1* and the motor MG2 with the torque command Tm2*. Such settings of the torque commands Tm1* and Tm2* of the motors MG1 and MG2 cause the motors MG1 and MG2 to be driven in the range of the effective input limit Win* and the effective output limit Wout*. The operations of the motors MG1 and MG2 in the range of the effective input limit Win* and the effective output limit Wout* effectively prevent a significant temperature increase of the terminal of the battery 50 while ensuring required driving power output from the motor MG2 even in the case of frequent repetition of charging and discharging the battery 50 within a relatively short time period, for example, during a drive of the vehicle with the driver's frequent depression and release of the accelerator pedal 83.

As described above, the hybrid vehicle 20 of the embodiment corrects the basic input limit Wintmp, which is set based on the battery temperature Tb and the state of charge SOC of the battery 50, with the charge-discharge current Ib of the battery 50 and sets the corrected basic input limit Wintmp to the effective input limit Win*, while setting the effective output limit Wout* according to the battery temperature Tb and the state of charge SOC of the battery 50. This arrangement more adequately sets the effective input limit Win* and the effective output limit Wout*, compared with the conventional technique of simultaneously correcting the effective input limit and the effective output limit based on the temperature Tb of the battery 50. When the square mean value Sqib as the time average of the square values of the charge-discharge current Ib of the battery 50 exceeds the predetermined reference value Sqref, the procedure of the embodiment makes correction to decrease the basic input limit Wintmp and sets the decreasingly corrected basic input limit Wintmp to the effective input limit Win*. Such setting desirably prevents a significant temperature increase of the terminal of the battery 50. When the state of charge SOC is not lower than the preset reference level SOCref2, the basic output limit Wouttmp is directly set to the effective output limit Wout* without correction. Such setting desirably ensures the required driving power output from the motor MG2. When the state of charge SOC decreases below the preset reference level SOCref2, the procedure of the embodiment makes correction to decrease the basic output limit Wouttmp and sets the decreasingly corrected basic output limit Wouttmp to the effective output limit Wout*. Such setting makes the decrease of the power output from the motor MG2 in correlation with the decrease of the indicated value of the battery meter 90, thus preventing the driver from feeling odd and uncomfortable.

The hybrid vehicle 20 of the embodiment uses the square mean value Squb as the time average of the square values of the charge-discharge current Ib for comparison at step S140 in the input-output limit setting routine of FIG. 2. In order to consider both the charge current and the discharge current of the battery 50, the absolute value of the charge-discharge current Ib may alternatively be used for comparison. Integration of the square values or the absolute values of the charge-discharge current Ib over a preset time period may be used for comparison, instead of the time average of the square values of the charge-discharge current Ib.

The hybrid vehicle 20 of the embodiment sets the effective input limit Win* to linearly decrease at the preset rate α with elapse of time at step S190 in the input-output limit setting routine of FIG. 2. As long as the effective input limit Win* is set to have a decreasing tendency with elapse of the, the effective input limit Win* may be decreased stepwise with elapse of time, decreased along a curve, or decreased to 0 at a certain time.

The hybrid vehicle 20 of the embodiment sets the effective output limit Wout* to linearly decrease at the preset rate β with a decrease in state of charge SOC at step S210 in the input-output limit setting routine of FIG. 2. As long as the effective output limit Wout* is set to have a decreasing tendency with a decrease in state of charge SOC, the effective output limit Wout* may be decreased stepwise with a variation in state of charge SOC, decreased along a curve, or decreased to 0 at a certain SOC level.

The hybrid vehicle 20 of the embodiment corrects the basic input limit Wintmp and the basic output limit Wouttmp at steps S190 and S210 in the input-output limit setting routine of FIG. 2. Since the basic input limit Wintmp and the basic output limit Wouttmp are set with correction according to the state of charge SOC of the battery 50 at step S110, the further correction at steps S190 and S210 may thus be omitted when not required.

The hybrid vehicle 20 of the embodiment takes into account the heat capacity of the terminal of the battery 50. The heat capacity of any other component of the battery 50 that enables the degree of a temperature increase to be estimated according to the charge-discharge current Ib of the battery 50 may be taken into account, instead of the heat capacity of the terminal.

The hybrid vehicle 20 of the embodiment sets the basic input limit Wintmp and the basic output limit Wouttmp according to the battery temperature Tb and the state of charge SOC of the battery 50 at step S110 in the input-output limit setting routine of FIG. 2. The basic input limit Wintmp and the basic output limit Wouttmp may be set according to another physical quantity requiring restriction of charging and discharging the battery 50, for example, the inter-terminal voltage of the battery 50, the inner resistance of the battery 50, and the inner pressure of the battery 50 evolving a gas in the charging or discharging process.

The hybrid vehicle 20 of the embodiment is equipped with the battery meter 90. The battery meter 90 is, however, neither essential nor restrictive but may be omitted when not required.

Figure 12:
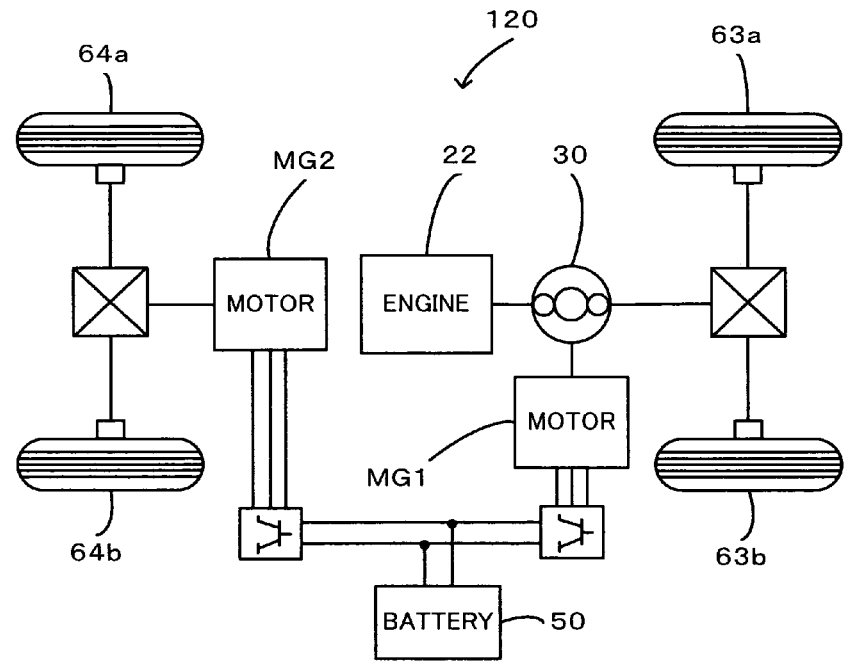
FIG. 12 schematically illustrates the configuration of another hybrid vehicle in one modified example.

In the hybrid vehicle 20 of the embodiment, the power of the motor MG2 is converted by the reduction gear 35 and is output to the ring gear shaft 32a. The technique of the invention is also applicable to a hybrid vehicle 120 of a modified structure shown in FIG. 12. In the hybrid vehicle 120 of FIG. 12, the power of the motor MG2 is connected to another axle (an axle linked with wheels 64a and 64b) that is different from the axle connecting with the ring gear shaft 32a (the axle linked with the drive wheels 63a and 63b).

Figure 13:
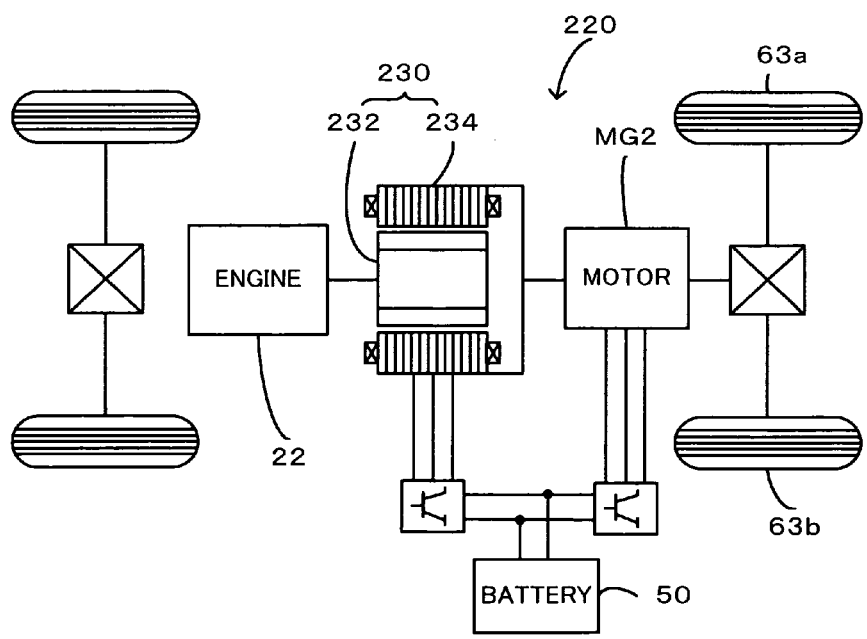
FIG. 13 schematically illustrates the configuration of still another hybrid vehicle in another modified example.

In the hybrid vehicle 20 of the embodiment, the power of the engine 22 is output via the power distribution integration mechanism 30 to the ring gear shaft 32a or the driveshaft linked with the drive wheels 63a and 63b. The technique of the invention is also applicable to a hybrid vehicle 220 of another modified structure shown in FIG. 13. The hybrid vehicle 220 of FIG. 13 is equipped with a pair-rotor motor 230. The pair-rotor motor 230 includes an inner rotor 232 connected to the crankshaft 26 of the engine 22 and an outer rotor 234 connected to a driveshaft for outputting power to the drive wheels 63a and 63b. The pair-rotor motor 230 transmits part of the output power of the engine 22 to the driveshaft, while converting the residual engine output power into electric power.

The embodiment and its modified examples regard application of the invention to the hybrid vehicle. The technique of the present invention is, however, not restricted to the hybrid vehicle but is also applicable to diversity of other applications, for example, a power supply device mounted on any of various vehicles other than motor vehicles, boats and ships, and aircraft, as well as a power supply device incorporated in any of stationary equipment, such as construction machinery.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The technique of the present invention is preferably applied to the manufacturing industries of power supply devices and vehicles.

The invention claimed is:
1. A power supply device constructed to input and output electric power, the power supply device comprising:

an accumulator designed to be chargeable and dischargeable;

a temperature sensor constructed to measure temperature of the accumulator;

a charge-discharge current meter constructed to measure a charge-discharge current to be charged into or discharged from the accumulator;

a state-of-charge calculator configured to compute a state of charge as an indication of an amount of electric power dischargeable from the accumulator, based on the measured charge-discharge current;

an input limit setter configured to set a basic input limit, as a maximum allowable electric power to be charged into the accumulator, according to the computed state of charge and the measured temperature, correct the set basic input limit based on the measured charge-discharge current, and set the corrected basic input limit to an effective input limit;

an output limit setter configured to set an effective output limit, as a maximum allowable electric power to be discharged from the accumulator, according to the computed state of charge and the measured temperature; and a square current calculator configured to compute a time average of square values of the measured charge-discharge current.

2. The power supply device in accordance with claim 1, wherein when the computed time average exceeds a preset average value, the input limit setter makes a decreasing correction of the basic input limit and sets the corrected basic input limit to the effective input limit.

3. The power supply device in accordance with claim 2, wherein when the computed time average exceeds the preset average value, the input limit setter corrects the basic input limit to have a decreasing tendency with elapse of time and sets the corrected basic input limit to the effective input limit.

4. The power supply device in accordance with claim 2, wherein the output limit setter sets a tentative basic output limit, as the maximum allowable electric power to be discharged from the accumulator, according to the measured temperature and, when the computed state of charge is lower than a preset first state-of-charge level, makes a decreasing correction of the tentative basic output limit and sets the decreasingly corrected tentative basic output limit to a basic output limit, when the computed state of charge becomes lower than a preset second state-of-charge level, which is higher than the first state-of-charge level, in the case of decreasingly correcting the basic input limit, the output limit setter making a decreasing correction of the basic output limit and setting the decreasingly corrected basic output limit to the effective output limit.

5. The power supply device in accordance with claim 1, wherein the output limit setter sets a basic output limit as the maximum allowable electric power to be discharged from the accumulator according to the computed state of charge and the measured temperature, corrects the set basic output limit based on the computed state of charge, and sets the corrected basic output limit to the effective output limit.

6. The power supply device in accordance with claim 1, the power supply device further having:

a voltage sensor configured to measure an inter-terminal voltage of an output terminal of the accumulator; and an internal pressure sensor configured to measure an internal pressure of the accumulator, wherein the input limit setter sets the basic input limit as the allowable maximum electric power to be charged into the accumulator according to at least one of the measured inter-terminal voltage and the measured internal pressure, in addition to the computed state of charge and the measured temperature, and the output limit setter sets a basic output limit as the maximum allowable electric power to be discharged from the accumulator according to at least one of the measured inter-terminal voltage and the measured internal pressure, in addition to the computed state of charge and the measured temperature.

7. A vehicle, comprising:

a driving source configured to output power to a driveshaft linked with an axle of the vehicle;

a motor configured to input and output power from and to the driveshaft;

an accumulator designed to be chargeable and dischargeable and arranged to enable transmission of electric power from and to the motor;

a temperature sensor constructed to measure temperature of the accumulator;

a charge-discharge current meter constructed to measure a charge-discharge current to be charged into or discharged from the accumulator;

a state-of-charge calculator configured to compute a state of charge as an indication of an amount of electric power dischargeable from the accumulator, based on the measured charge-discharge current;

an input limit setter configured to set a basic input limit, as a maximum allowable electric power to be charged into the accumulator, according to the computed state of charge and the measured temperature, correct the set basic input limit based on the measured charge-discharge current, and set the corrected basic input limit to an effective input limit;

an output limit setter configured to set an effective output limit, as a maximum allowable electric power to be discharged from the accumulator, according to the computed state of charge and the measured temperature;

a square current calculator configured to compute a time average of square values of the measured charge-discharge current; and a controller configured to control the driving source and the motor to charge and discharge the accumulator in a range defined by the set effective input limit and the set effective output limit.

8. The vehicle in accordance with claim 7, wherein when the computed time average exceeds a preset average value, the input limit setter makes a decreasing correction of the basic input limit and sets the corrected basic input limit to the effective input limit.

9. The vehicle in accordance with claim 7, wherein the output limit setter sets a basic output limit as the maximum allowable electric power to be discharged from the accumulator according to the computed state of charge and the measured temperature, corrects the set basic output limit based on the computed state of charge, and sets the corrected basic output limit to the effective output limit.

10. The vehicle in accordance with claim 7, the vehicle further having:

a voltage sensor configured to measure an inter-terminal voltage of an output terminal of the accumulator; and an internal pressure sensor configured to measure an internal pressure of the accumulator, wherein the input limit setter sets the basic input limit as the allowable maximum electric power to be charged into the accumulator according to at least one of the measured inter-terminal voltage and the measured internal pressure, in addition to the computed state of charge and the measured temperature, and the output limit setter sets a basic output limit as the maximum allowable electric power to be discharged from the accumulator according to at least one of the measured inter-terminal voltage and the measured internal pressure, in addition to the computed state of charge and the measured temperature.

11. The vehicle in accordance with claim 7, the vehicle further having:

a state-of-charge display unit configured to display the computed state of charge of the accumulator.

12. An input-output limit setting method in a power supply device equipped with a chargeable and dischargeable accumulator and constructed to input and output electric power, the input-output limit setting method setting an effective input limit as a maximum allowable electric power to be charged into the accumulator and setting an effective output limit as a maximum allowable electric power to be discharged from the accumulator, the input-output limit setting method comprising:

computing a state, of charge as an indication of an amount of electric power dischargeable from the accumulator, based on a measured charge-discharge current to be charged into or discharged from the accumulator;

setting a basic input limit, as the maximum allowable electric power to be charged into the accumulator, according to the computed state of charge and a temperature of the accumulator, correcting the set basic input limit based on the charge-discharge current, and setting the corrected basic input limit to the effective input limit;

setting the effective output limit, as the maximum allowable electric power to be discharged from the accumulator, according to the computed state of charge and the temperature of the accumulator; and computing a time average of square values of the measured charge-discharge current.

13. A vehicle control method for controlling a vehicle, the vehicle comprising: a power supply device equipped with a chargeable and dischargeable accumulator and constructed to input and output electric power; a driving source configured to output power to a driveshaft linked with an axle of the vehicle; and a motor configured to enable transmission of electric power to and from the power supply device and to input and output power from and to the driveshaft, the vehicle control method comprising:

computing a state of charge as an indication of an amount of electric power dischargeable from the accumulator, based on a measured charge-discharge current to be charged into or discharged from the accumulator;

setting a basic input limit, as a maximum allowable electric power to be charged into the accumulator, according to the computed state of charge and a temperature of the accumulator, correcting the set basic input limit based on the charge-discharge current, and setting the corrected basic input limit to an effective input limit;

setting an effective output limit, as a maximum allowable electric power to be discharged from the accumulator, according to the computed state of charge and the temperature of the accumulator;

computing a time average of square values of the measured charge-discharge current; and controlling the driving source and the motor to charge and discharge the accumulator in a range defined by the set effective input limit and the set effective output limit.

* * * * *